Figure 1:
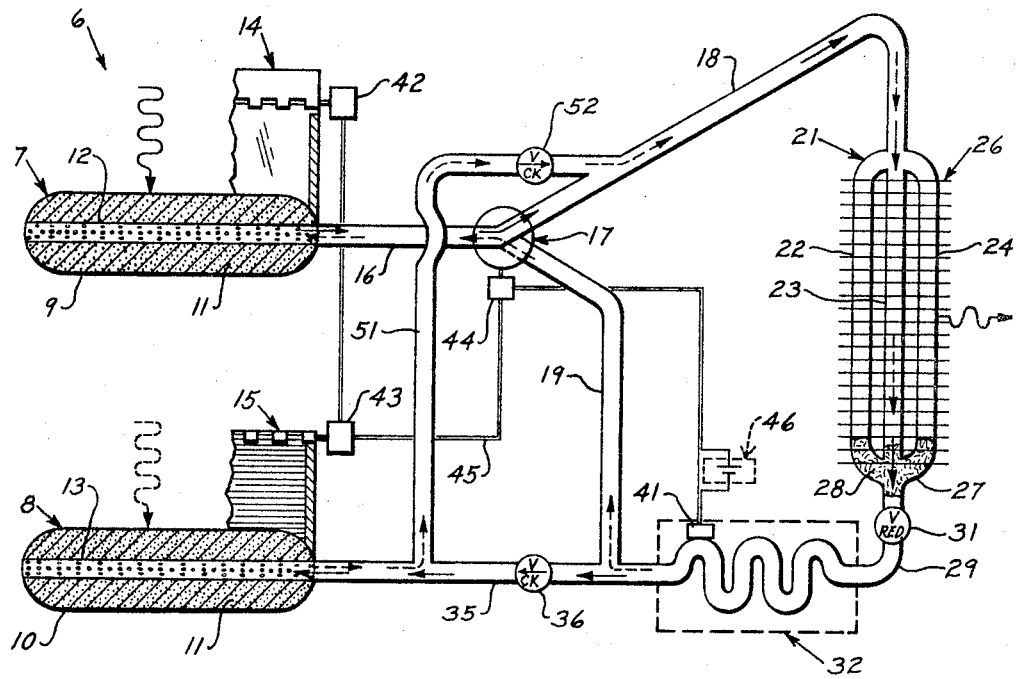

Sept. 6, 1966  JAMES E. WEBB  3,270,512
ADMINISTRATOR OF THE NATIONAL AERONAUTICS
AND SPACE ADMINISTRATION
INTERMITTENT TYPE SILICA GEL ADSORPTION REFRIGERATOR
Filed Dec. 9, 1963

INVENTORS
John M. F. Vickers
Ernest Romvary, Jr.
BY
ATTORNEYS

United States Patent Office 3,270,512
Patented Sept. 6, 1966

3,270,512
INTERMITTENT TYPE SILICA GEL ADSORPTION REFRIGERATOR
James E. Webb, Administrator of the National Aeronautics and Space Administration with respect to an invention of John Michael Frank Vickers and Ernest Romvary, Jr.
Filed Dec. 9, 1963, Ser. No. 329,331
11 Claims. (Cl. 62—2)

This invention relates to a refrigeration system and more particularly to a mechanical refrigeration system of the adsorption type for use in providing temperature control for spacecraft components.

In the designing of spacecraft the problem of temperature control for spacecraft components is one of critical importance. It is particularly a problem in the designing of spacecraft which are intended to be attitude-oriented in flight so as to constantly present one side towards the sun for relatively long periods of time. The extreme temperatures which result from the incident solar radiation may reach levels which are sufficient to render many of the spacecraft components, such as the telemetry and communications systems, sensors, and the like, inoperative unless compensating measures are taken. While techniques have been devised to contend with this problem, as, for example, the technique of providing various surfaces with different degrees of reflectivity and insulation to protect against the incident sunlight, these generally provide only a passive or limited measure of control and are inadequate for proper cooling of components. Consequently, if adequate cooling is to be obtained, a system of refrigeration which will provide an active control means is required. For use in spaceflight it is desirable that such a system does not require auxiliary heating apparatus for energizing the system and that it be capable of providing for continuous refrigeration. It is also necessary that the system will operate effectively in a zero gravity environment.

Refrigeration systems of the compression type are generally undesirable for use in spacecraft since they are relatively complex and require many moving parts. On the other hand, the conventional refrigeration systems of the adsorption type, while reliable and simple, are not suitable for use in zero gravity environment since such systems generally employ a float chamber to separate the liquid and gaseous phases of the working fluid which, of course, would operate unsatisfactorily in a zero gravity environment. These systems also generally require that heat be provided to the system by such means as the combustion of a hydrocarbon gas, or the like, which would be particularly undesirable for use in a spacecraft for such obvious reasons as the problem of long-term operation, the added weight requirements, complexity, and the additional hazard. Refrigeration systems have been devised which utilize solar radiation for energizing the system and comprise intermittent operating units which operate alternately to produce refrigeration, but these prior art systems generally operate in accordance with the cycle of night and day or the transit of the sun, and include no means for alternating the cyclic period without the requirement of auxiliary heating or cooling systems. In addition, these systems rely on the presence of gravitational force for effective operation.

The refrigeration system of this invention is an improved adsorption type system utilizing the application of solar radiation to provide heat for generation of refrigerant. The system comprises a pair of adsorber-generator vessels which are mounted on the spacecraft in a manner so as to present one of their sides to solar radiation input while opposite sides of the vessels are exposed to black sky. A pair of shutter or louver systems operated by thermostatically controlled mechanisms are also provided on the spacecraft and mounted so as to be adapted to alternately shade the vessels from solar radiation. When one of the vessels is exposed to sunlight, refrigerant is driven off from adsorbent material therein and directed through a valve means to a condenser and evaporator for cooling a spacecraft component. The working fluid from the evaporator is then delivered to the second adsorber-generator vessel which is shaded by its louver system and is therefore in a cooled state whereby it is conditioned to adsorb refrigerant. A constant circulation of refrigerant to produce refrigeration is therefore effected by adsorption of refrigerant in the cooled adsorber-generator while refrigerant is driven off from adsorbent material in the heated adsorber-generator.

The refrigerating process thus continues until most of the refrigerant is driven form the first vessel and the adsorbent-material in the second vessel becomes nearly saturated. When this occurs, the temperature in the evaporator coil rises and actuates a bimetallic device which thermostatically controls solenoid-actuated mechanisms for closing the shutters adjacent the first vessel and opening the shutters adjacent the second vessel, while at the same time turning the valve means to a second operating position whereby the system is prepared for a reverse circulation cycle of refrigerant.

In the reverse cycle, refrigerant is generated from the second vessel, delivered through the condenser and evaporator, and returned for readsorption by the first vessel. The reverse cycle continues until almost all refrigerant is driven from the second vessel and readsorbed by the adsorbent material in the first vessel, whereupon the thermostat controls will then operate to return the shutters and valve means to their original positions in which the system is once again conditioned for the forward circulation cycle.

It will therefore be apparent that the refrigerant system of this invention will cycle continuously for an indefinite period and is one which employs a minimum of moving parts exposed to the space environment. It is also a system which is particularly adapted for operation in a zero gravity environment since driving force for the refrigerant fluid is derived from the difference in vapor pressures of the refrigerant in the heated and cooled adsorption vessels and is therefore independent of gravitational forces.

Figure 2:
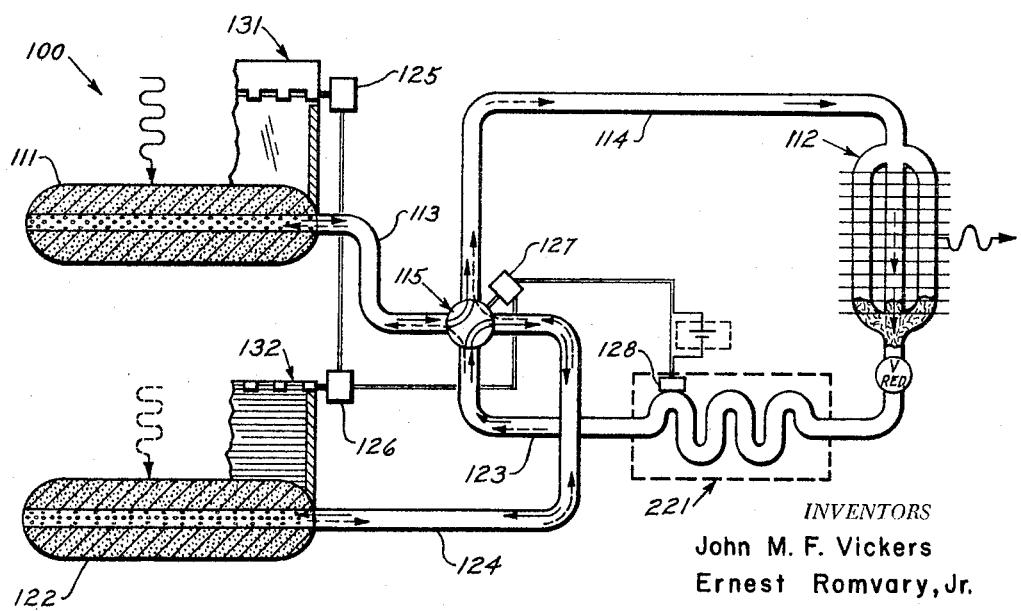

Other objects and many of the attendant advantages of this invention will be readily appreciated as the same become better understood by reference to the following detailed description when considered in connection with the accompanying drawings in which like reference numerals designate like parts throughout the figures thereof and wherein:

FIG. 1 is a schematic diagram of the refrigeration system of this invention with the adsorber-generators of the system shown in section, and arrows indicating the direction of refrigerant flow in the system and heat radiation external of the system, and FIG. 2 is a schematic diagram similar to FIG. 1 of a preferred embodiment of the invention and represents a modified form of the refrigeration system in FIG. 1.

Referring now more particularly to FIG. 1 of the drawing, the refrigeration system 6 comprises a pair of adsorber-generators 7 and 8 which are situated on a spacecraft (not shown) in a manner so as to present one of their sides to solar radiation while their opposite sides are shaded and exposed to the black sky of deep space. Each of the adsorber-generators comprises a stainless steel chamber vessel 9 and 10, respectively, which is partly filled with a quantity of silica gel 11 as adsorbent material.

In the refrigeration system 6, the chamber vessels 9 and 10 are substantially in the form of circular cylinders and each is provided with a stainless steel tubular screen 12 and 13, respectively, which is disposed coaxially therein and extends the length of the cylinder. The porous silica gel is disposed annularly between the tubular screen and the cylinder wall. One of the properties of silica gel is that it is particularly adsorptive to sulphur dioxide and other refrigerant gases if maintained at a sufficiently low temperature. While silica gel is a preferred adsorbent material, other solid adsorbents, such as activated charcoal or chlorides of the alkaline earth metals, might also be used. Further, the shapes of the adsorber-generator vessels may, of course, be other than circular cylinders but it is desirable, however, that the shapes of the vessels be such that a large surface area of the silica gel within the vessel is exposed to the gaseous environment of the system to thereby facilitate the adsorption or generation of the refrigerant.

A shutter arrangement or louver system 14 comprising a substantially planar arrangement of shutters is mounted on the spacecraft adjacent the adsorber-generator 7 in a position to shade or expose the adsorber-generator to sunlight in accordance with the closed or open condition of the shutters. An identical louver system 15 is mounted on the spacecraft adjacent the adsorber-generator 8 for selectively shading or exposing the adsorber-generator 8. These louver systems are desirably fabricated of thin aluminum and utilize dry lubricants to prevent freezing of their movable parts.

The vessel 9 is provided with a single opening or port at which it is connected to a conduit 16 which leads to a two-way valve 17 for selectively communicating the conduit 16 with either of a pair of conduits 18 or 19. The conduit 18 connects with the inlet end of a condenser 21 which is shaded and cooled constantly by exposure to deep space.

In the initial operation of the system the silica gel in the adsorber-generator 7 is substantially saturated with sulphur dioxide while there is desirably a low concentration of sulphur dioxide in the adsorber-generator 8. The louver system 14 is open so that the adsorber-generator 7 is exposed to solar radiation and sulphur dioxide is driven off from the silica gel therein and communicated to the condenser with the valve 17 in a first operating position wherein the conduits 16 and 18 are in fluid communication. The direction of refrigerant flow in the system for the initial cycle of operation is indicated in the drawing by the solid arrows.

The condenser 21 is comprised of three tubes (22, 23, and 24) of thin-walled stainless steel which communicate at their ends with the inlet and outlet ends of the condenser, respectively. An aluminum finned radiator 26 is attached to the condenser to facilitate the dissipation of heat carried by the refrigerant. On an attitude-oriented spacecraft the location of the condenser and radiator is selected so that they will normally be shaded from the sun.

The down-stream end 27 of the condenser is provided with a wick or porous plug 28 of glass wool, or the like, which traps the condensate and prevents the passage of gaseous fluid through the condenser. By wicking action of the porous plug, the liquid sulphur dioxide passes out of the condenser into a conduit 29 and through a pressure reducing valve 31 installed within the conduit. The conduit 29 leads to an evaporator coil 32 wherein the mixture of liquid and wet vapor which emerges from the pressure reducing valve 31 enters the evaporator coil where it is evaporated and cools the spacecraft component by extracting heat therefrom.

The working fluid from the evaporator leaves as a super-heated fluid through an exit conduit 35 which communicates the fluid to the adsorption vessel 8. A one-way ball-type check valve 36 is installed within the conduit 35 and controls the direction of fluid flow through the conduit in the direction away from the evaporator. While the adsorber-generator 7 is exposed to solar radiation the adsorber-generator 8 is shaded by its associated louver system and exposed only to the black sky of deep space so that it is therefore in a relatively cool state whereby it is conditioned to adsorb the superheated refrigerant fluid which enters the vessel from the evaporator. The circulation of refrigerant thus described will continue until most of the sulphur dioxide is driven from the adsorber-generator vessel 9 and the adsorbent material in the vessel 10 becomes nearly saturated with the refrigerant.

At this time the temperature in the evaporator coil rises since there is only a small amount of liquid sulphur dioxide which is being admitted to the evaporator coil for evaporation. At a sufficiently high temperature, a bi-metallic device 41 positioned to respond to the changes of temperature within the evaporator of the chamber surrounding it is actuated to close an electric circuit which energizes respective solenoid-actuated controls 42 and 43 to close the shutters adjacent the adsorber-generator 7 and open the shutters adjacent the adsorber-generator 8. Simultaneously therewith, a solenoid control 44 is energized by the circuit to turn the valve means 17 to a second operating position whereby the conduit 16 is connected in communication with the conduit 19 which connects at its other end to the exit conduit from the evaporator at a point between the outlet end of the evaporator and the check valve 36. The solenoids in the circuit are electrically connected in parallel by the electrical cable 45 and the bi-metallic device acts as a switch to close the circuit and energize the solenoids. One of the cable conductors is connected to a source of power 46 for the circuit which may be a dry cell, solar battery, or the like.

In the second position of the valve means 17 which connects conduits 19 and 16, and by the closed and open conditions of the louver systems 14 and 15, respectively, the system is prepared for a reverse circulation cycle of refrigerant. The piping system for accommodating a reverse circulation of refrigerant is provided with a conduit 51 which communicates the conduit 35 with the conduit 18 at a point between the check valve 36 and the adsorption vessel 8. A check valve 52, similar to the valve 36, is installed within the conduit 51 and together with the valve 36 determines the direction of fluid flow through the conduit 51 in a direction away from the conduit 35. During the reverse cycle, the refrigerant sulphur dioxide is generated from the heated adsorber-generator 8 and delivered through the conduits 35, 51, and 18, the condenser 21, and evaporator 32, from whence it is returned to the adsorption vessel 9 by way of the conduits 19 and 16 and valve 17. The direction of refrigerant flow for this cycle of operation is indicated in the drawing by the dash lined arrows.

The solenoid-actuated control mechanisms for positioning the shutters an dtwo-way valve means are designed whereby there will be no re-positioning of the shutters and two-way valve means as the bi-metallic device is cooled by the evaporator and the solenoids are de-energized. This may be accomplished by use of conventional ratchet and pawl mechanisms (not shown) which are actuated by the solenoid plungers for moving the shutters and valve.

The reverse circulation cycle continues until substantially all refrigerant is driven from the vessel 10 and re-adsorbed by the adsorbent material in the adsorption vessel 7. As occurs in the forward cycle, heating of the evaporator then causes the thermostat controls to operate to return the shutters and valve means 17 to their original positions in which the system is once again conditioned for a forward cycle of refrigerant circulation.

It is to be noted that in the forward cycle the working fluid from the evaporator will pass into the adsorption vessel 10 rather than pass through the conduits 19 and 51 because the conduit 19 is closed by the valve 17 and the conduit 51 is blocked by the check valve 52 which is closed by the fluid pressure communicated thereto from conduit 18 which is in excess of the reduced pressure fluid from the evaporator. During the reverse cycle the check valve 36 is maintained in closed condition by the difference in fluid pressures acting on opposite sides thereof so that fluid flow from the evaporator is directed through the conduits 19 and 16 to the adsorption vessel 9.

To avoid the deleterious corrosive effects of sulphur dioxide, all parts of the refrigeration system which are exposed to contact with the sulphur dioxide refrigerant are fabricated of stainless steel or other materials chemically stable to sulphur dioxide. With other refrigerants, of course, other metals might be used in the conduit system.

It will therefore be seen that an adsorption type refrigeration system is disclosed herein which is adapted to provide continuous refrigeration while operating in a zero gravity environment and which will operate indefinitely without the requirement of auxiliary heating apparatus. Furthermore, separation of the liquid and gaseous phases of refrigerant in the system is accomplished by a wick means which obviates the need of movable parts and apparatus of the type which is dependent on gravitational forces for operation.

Although the refrigeration system of this invention is particularly intended for use on a spacecraft which may be attitude-oriented relative to the sun, the system may also obviously be used in other applications where the adsorber-generators may be exposed to a heat differential, and particularly wherever it is desired to use solar radiation as a heat source for energizing an adsorbent type refrigeration system.

In FIG. 2 there is disclosed a preferred embodiment 100 of the invention which represents a modification of the system of FIG. 1. All of the components in this system are identical to those in the system of FIG. 1 excepting for the valve means and conduit system for guiding the flow of refrigerant. Instead of a two-way valve this system employs a four-way valve for controlling the direction of the circulation of refrigerant and also has the advantage of not requiring the use of check valves which have a propensity to leakage.

As indicated by the solid arrows in FIG. 2, refrigerant generated from the absorber-generator vessel 111 is directed to the condenser 112 by means of conduits 113 and 114 when these are connected in fluid communication by the four-way valve 115. In this position of the four-way valve, refrigerant from the evaporator 221 is delivered to the second adsorber-generator vessel 122 by means of the conduits 123 and 124. As in the system of FIG. 1, the refrigeration process continues until there is almost total depletion of refrigerant in the vessel 111 and almost complete saturation in the vessel 122, at which time the thermostat controls (125, 126, 127, and 128) operate to reposition the louver systems 131 and 132 adjacent the adsorber-generator vessels and at the same time reposition the four-way valve in the position indicated by the dashed lines in FIG. 2. In these positions of the louver systems and valve means the system is conditioned for the reverse circulation cycle as indicated by the dash line arrows. Since this system does not rely on any more than one valve to determine the direction of refrigerant flow in the system, and does not require check valves, it is preferred over the system described in FIG. 1.

To initiate operation in space of either of the systems of FIG. 1 or 2, the reduction valve in the conduit leading from the condenser is opened from an initially closed condition by an electrically actuated squib or solenoid which may be triggered by an appropriate communications signal or a timing device. As soon as the temperature of the adsorber-generator which is exposed to solar radiation reaches a sufficient level for sulphur dioxide to be generated therefrom, the opened reduction valve which is then in a permanently opened condition will permit the circulation of the sulphur dioxide to produce refrigeration.

In the installation of the refrigeration system of this invention in a spacecraft, only the adsorber-generator vessels with their associated louver systems and the condenser need be installed externally so that only a minimum of moving parts are exposed to the space environment. The system is capable of operating continuously for an indefinite period using only solar radiation as the means for providing heat for the system.

It will therefore be seen that a new and improved refrigeration system of the type employing a pair of adsorber-generator units is disclosed herein in which the alternating cyclical generation of refrigerant from the adsorber-generator units is controlled automatically by a single control system and reversal of generating and adsorbing units occurs periodically when there is substantial depletion of refrigerant in the generating unit and corresponding saturation of the adsorption unit. Since the system employs a minimum of moving parts and is not dependent on gravitational forces for operation, it is particularly adapted for operation in a zero-gravity environment.

Although the means for shading the adsorber-generator vessels are described as louver systems arranged in a planar configuration, it is obvious, of course, that other configurations suitable for effectively shading the adsorber-generator vessels might also be used. Also, shading devices such as pivotal shade panels, or the like, which are adapted to be operably positioned by thermostat controls, could be used in lieu of the louver systems.

It should be understood, of course, that the foregoing disclosure relates only to preferred embodiments of the invention and that it is intended to cover all changes and modifications of the examples in the invention herein chosen for the purposes of the disclosure which do not constitute departures from the spirit and scope of the invention. What is claimed and desired to be secured by Letters Patent is:

1. Refrigeration apparatus for cooling components in a spacecraft which is adatped to be attitude-oriented in space flight, said apparatus comprising:

first and second adsorber-generator vessels each containing a refrigerant adsorbing substance and adapted to be mounted externally of the spacecraft in a position where they are exposed to solar radiation when the spacecraft is attitude-oriented in flight, one of said vessels containing refrigerant which has been adsorbed by the refrigerant-adsorbing substance;

first shutter means mountable on the spacecraft in a position to be adapted to shade said first adsorber-generator vessel;

second shutter means mountable on the spacecraft in a position to be adapted to shade the second adsorber-generator vessel, one of said shutter means being in an opened condition to expose the adsorber-generator vessel which contains refrigerant and the other shutter means being in a closed condition to shade the other adsorber-generator vessel;

a condenser having an inlet for receiving refrigerant fluid and an outlet for discharge of said fluid;

an evaporator connected in fluid communication with the outlet of said condenser and adapted to evaporate refrigerant liquid introduced therein to thereby produce refrigeration by extracting heat from its environment, said evaporator having an outlet for the discharge of refrigerant fluid;

a conduit system comprising a condenser inlet conduit communicating with the inlet of the condenser, an evaporator exit conduit communicating with the outlet of the evaporator, and a pair of flow conduits respectively communicating with the openings of said adsorber-generator vessels;

valve means installed in said conduit system and operable in a first control position for communicating the flow conduit associated with the exposed adsorber-generator vessel with the condenser inlet conduit and for communicating the flow conduit associated with the other adsorber-generator vessel with the evaporator exit conduit, said valve means being operable in a second control position for reversing the connections of the flow conduits with the condenser inlet conduit and the evaporator exit conduit;

wick means in the outlet of said condenser for separating the liquid and gaseous phases of the refrigerant fluid whereby refrigerant fluid is communicated to the evaporator from the condenser by wicking action; and automatic control means for operating said first and second shutter means to reverse the conditions of exposure and non-exposure of the adsorber-generator vessels when the exposed adsorber-generator vessel is substantially depleted of refrigerant fluid and for simultaneously positioning said valve means to reverse the connections of the adsorber-generator flow conduits with the inlet of the condenser and the outlet of the evaporator.

2. Refrigeration apparatus for cooling components in a spacecraft which is adapted to be attitude-oriented in space flight, said apparatus comprising:

first and second adsorber-generator vessels each containing a refrigerant adsorbing substance and adapted to be mounted externally of the spacecraft in a position where they are exposed to solar radiation when the spacecraft is attitude-oriented in flight, one of said vessels containing refrigerant which has been adsorbed by the refrigerant-adsorbing substance;

first shutter means mountable on the spacecraft in a position to be adapted to shade said first adsorber-generator vessel;

second shutter means mountable on the spacecraft in a position to be adapted to shade the second adsorber-generator vessel, one of said shutter means being in an opened condition to expose the adsorber-generator vessel which contains refrigerant and the other shutter means being in a closed condition to shade the other adsorber-generator vessel;

a condenser having an inlet for receiving refrigerant fluid and an outlet for discharge of said fluid;

an evaporator connected in fluid communication with the outlet of said condenser and adapted to evaporate refrigerant liquid introduced therein to thereby produce refrigeration by extracting heat from its environment, said evaporator having an outlet for the discharge of refrigerant fluid;

a conduit system comprising a condenser inlet conduit communicating with the inlet of the condenser, an evaporator exit conduit communicating with the outlet of the evaporator, and a pair of flow conduits respectively communicating with the openings of said adsorber-generator vessels;

valve means installed in said conduit system and operable in a first control position for communicating the flow conduit associated with the exposed adsorber-generator vessel with the condenser inlet conduit and for communicating the flow conduit associated with the other adsorber-generator vessel with the evaporator exit conduit, said valve means being operable in a second control position for reversing the connections of the flow conduits with the condenser inlet conduit and the evaporator exit conduit;

wick means in the outlet of said condenser for separating the liquid and gaseous phases of the refrigerant fluid whereby refrigerant fluid is communicated to the evaporator from the condenser by wicking action;

means for reducing the pressure of refrigerant fluid from the condenser before communicating to the evaporator; and automatic control means for operating said first and second shutter means to reverse the conditions of exposure and non-exposure of the adsorber-generator vessels when the exposed adsorber-generator vessel is substantially depleted of refrigerant fluid and for simultaneously positioning said valve means to reverse the connections of the adsorber-generator flow conduits with the inlet of the condenser and the outlet of the evaporator.

3. Refrigeration apparatus for cooling components in a spacecraft which is adapted to be attitude-oriented in space flight, said apparatus comprising:

first and second adsorber-generator vessels each containing a refrigerant adsorbing substance and adapted to be mounted externally of the spacecraft in a position where they are exposed to solar radiation when the space-craft is attitude-oriented in flight, one of said vessels containing refrigerant which has been adsorbed by the refrigerant-adsorbing substance;

first shutter means mountable on the spacecraft in a position to be adapted to shade said first adsorber-generator vessel;

second shutter means mountable on the spacecraft in a position to be adapted to shade the second adsorber-generator vessel, one of said shutter means being in an opened condition to expose the adsorber-generator vessel which contains refrigerant and the other shutter means being in a closed condition to shade the other adsorber-generator vessel;

a condenser having an inlet for receiving refrigerant fluid and an outlet for discharge of said fluid;

an evaporator connected in fluid communication with the outlet of said condenser and adapted to evaporate refrigerant liquid introduced therein to thereby produce refrigeration by extracting heat from its environment, said evaporator having an outlet for the discharge of refrigerant fluid;

a conduit system including valve means for communicating the exposed absorber-generator vessel with the inlet of the condenser and the other of said vessels with the outlet of the evaporator whereby refrigerant liberated from the exposed adsorber-generator will be communicated to the condenser for circulation through the condenser and evaporator;

porous wick means occluding the outlet of said condenser for separating the liquid and gaseous phases of the refrigerant fluid whereby refrigerant liquid is communicated to the evaporator by wicking action;

means for reducing the pressure of refrigerant fluid from the condenser before communicating to the evaporator; and an automatic control means for operating said first and second shutter means to reverse the conditions of exposure and non-exopsure of the adsorber-generator vessels when there is substantial depletion of refrigerant fluid in the exposed adsorber-generator and for simultaneously actuating said valve means to reverse the connections of the adsorber-generator vessels with the inlet of the condenser and the outlet of the evaporator.

4. An adsorption type refrigeration system adapted for operation in a zero gravity environment, said system comprising:

first and second adsorber-generator vessels each containing a refrigerant adsorbing substance and having an opening for receiving or discharging refrigerant fluid therethrough, one of said vessels containing refrigerant which has been adsorbed by the refrigerant-adsorbing substance, said refrigerant containing vessel being exposed to solar radiation and the other of said vessels being shielded from solar radiation;

a condenser having an inlet for receiving refrigerant fluid and an outlet for discharging of said fluid;

an evaporator connected in fluid communication with the outlet of said condenser and adapted to evaporate refrigerant liquid introduced therein to thereby produce refrigeration by extracting heat from its environment, said evaporator having an outlet for the discharge of refrigerant fluid;

a conduit system comprising a condenser inlet conduit communicating with the inlet of the condenser and an evaporator exit conduit communicating with the outlet of the evaporator and a pair of flow conduits respectively communcating with the openings of said adsorber-generator vessels;

valve means installed in said conduit system and operable in a first position for communicating the flow conduit associated with the exposed adsorber-generator vessel with the condenser inlet conduit and communicating the flow conduit associated with the other adsorber-generator vessel with the evaporator exit conduit, said valve means being operable in a second position for reversing the connections of the flow conduits with the condenser inlet conduit and the evaporator exit conduit;

a porous wick occluding the outlet of said condenser for separating the liquid and gaseous phases of the refrigerant fluid whereby refrigerant fluid is communicated to the evaporator by wicking action;

means for reducing the pressure of refrigerant fluid from the condenser before communicating to the evaporator; and automatic control means for periodically reversing the conditions of exposure and non-exposure of the adsorber-generator vessels to solar radiation and actuating said valve means to reverse the connections of the adsorber-generator flow conduits with the inlet of the condenser and the outlet of the evaporator.

5. Refrigeration apparatus for cooling components in a spacecraft which is adapted to be attitude-oriented in space flight, said apparatus comprising:

first and second adsorber-generator vessels each containing a refrigerant absorbing substance and adapted to be mounted externally of the spacecraft in a position where they are exposed to solar radiation when the spacecraft is attitude-oriented in flight, one of said vessels containing refrigerant which has been adsorbed by the refrigerant-adsorbing substance;

first means mountable on the spacecraft and operable to alternately shade and expose the first adsorber-generator vessel from solar radiation; second means mountable on the spacecraft and operable to alternately shade and expose said second adsorber-generator vessel, one of said means being conditioned to expose the adsorber-generator vessel which contains refrigerant and the other said means being operably conditioned to shade the other adsorber-generator vessel;

a condenser having an inlet for receiving refrigerant fluid and an outlet for discharge of said fluid;

an evaporator connected in fluid communication with the outlet of said condenser, said evaporator having an outlet and adapted to evaporate refrigerant liquid introduced therein to thereby produce refrigeration by extracting heat from its environment;

a conduit system including valve means for communicating the exposed adsorber-generator vessel with the inlet of the condenser and the other of said vessels with the outlet of the evaporator whereby refrigerant liberated from the exposed adsorber-generator will be communicated to the condenser to be condensed thereby;

porous wick means in the outlet of said condenser for separating the liquid and gaseous phases of the refrigerant fluid whereby refrigerant liquid is communicated to the evaporator from the condenser by wicking action; and an automatic control means for operating said first and second means to reverse the condititons of exposure and non-exposure of the adsorber-generator vessels when there is substantial depletion of refrigerant fluid in the exposed adsorber-generator and for simultaneously actuating said valve means to reverse the connections of the adsorber-generator vessels with the inlet of the condenser and the outlet of the evaporator.

6. In combination with a spacecraft which is adapted to be attitude-oriented in space flight:

an adsorption refrigeration apparatus which is capable of operation in a zero gravity environment, said refrigeration apparatus comprising first and second adsorber-generator vessels, each containing a refrigerant-adsorbing substance and mounted externally of said spacecraft in position where they are adapted to be exposed to solar radiation when the spacecraft is attitude-oriented;

first means mounted on the spacecraft and operable to alternately shade and expose said first adsorber-generator vessel from solar radiation;

second means mounted on the spacecraft and operable to alternately shade and expose said second adsorber-generator vessel, one of said means being operably conditioned to expose one of said adsorber-generator vessels and the other said means being operably conditioned to shade the other adsorber-generator vessel;

a condenser and evaporator in series fluid communication, said condenser having an inlet for receiving refrigerant fluid and said evaporator having an outlet for said fluid;

a conduit system including valve means for communicating the exposed adsorber-generator vessel with the inlet of the condenser and the other of said vessels with the outlet of the evaporator; and automatic control means for operating said first and second means to reverse the conditions of exposure and non-exposure of the adsorber-generator vessels when there is depletion of refrigerant fluid in the exposed adsorber-generator vessel, said automatic control means simultaneously actuating said valve means to reverse the connections of the adsorber-generator vessels with the inlet of the condenser and the outlet of the evaporator.

7. An adsorption type refrigeration system adapted for operation in a zero gravity environment, said system comprising:

first and second adsorber-generator vessels each containing refrigerant-adsorbing substance and adapted to be exposed to solar radiation, one of said vessels containing refrigerant which has been adsorbed by the refrigerant-adsorbing substance, said refrigerant-containing vessel being exposed to solar radiation and the other of said vessels being shielded from solar radiation;

a condenser having an inlet for receiving refrigerant fluid and an outlet for discharging of said fluid;

an evaporator connected in fluid communication with the outlet of said condenser and adapted to evaporate refrigerant liquid introduced therein to thereby produce refrigeration by extracting heat from its environment, said evaporator having an outlet for the discharge of refrigerant fluid;

a conduit system including valve means for communicating the exposed adsorber-generator vessel with the inlet of the condenser and the other of said vessels with the outlet of said evaportor whereby refrigerant liberated from the exposed adsorber-generator will be communicated to the condenser for circulation through the condenser and evaporator;

a porous wick occluding the outlet of said condenser for separating the liquid and gaseous phases of the refrigerant fluid whereby refrigerant liquid is communicated to the evaporator by wicking action;

means for reducing the pressure of refrigerant fluid from the condenser before communicating to the evaporator; and an automatic control means for periodically reversing the conditions of exposure and non-exposure of the adsorber-generator vessels to solar radiation and simultaneously actuating said valve means to reverse the connections of the adsorber-generator vessels with the inlet of the condenser and the outlet of the evaporator.

8. An adsorption type refrigeration system adapted for operation in a zero gravity environment, said system comprising:

first and second adsorber-generator vessels each containing a refrigerant-adsorbing substance and adapted to be exposed to solar radiation, one of said vessels containing refrigerant which has been adsorbed by the refrigerant-adsorbing substance, said refrigerant-containing vessel being exposed to solar radiation and the other of said vessels being shielded from solar radiation;

a condenser having an inlet for receiving refrigerant fluid and an outlet for discharge of said fluid;

an evaporator connected in fluid communication with the outlet of said condenser and adapted to evaporate refrigerant liquid introduced therein to thereby produce refrigeration by extracting heat from its environment, said evaporator having an outlet for the discharge of refrigerant fluid;

a conduit system including valve means for communicating the exposed adsorber-generator vessel with the inlet of the condenser and the other of said vessels with the outlet of the evaporator whereby refrigerant liberated from the exposed adsorber-generator will be circulated through the condenser and evaporator;

a porous wick occluding the outlet of said condenser for separating the liquid and gaseous phases of the refrigerant fluid whereby refrigerant liquid is communicated to the evaporator by wicking action; and an automatic control means for periodically reversing the conditions of exposure and non-exposure of the adsorber-generator vessels to solar radiation and simultaneously actuating said valve means to reverse the connections of the adsorber-generator vessels with the condenser and evaporator.

9. Refrigeration apparatus for cooling components in a space craft which is adapted to be attitude-oriented in space flight, said apparatus comprising:

first and second adsorber-generator vessels each containing a refrigerant adsorbing substance and adapted to be mounted externally of the space craft in a position where they are exposed to solar radiation when the space craft is attitude-oriented in flight, one of said vessels containing refrigerant which has been adsorbed by the refrigerant-adsorbing substance;

first means mountable on the space craft and operable to alternately shade and expose said first adsorber-generator vessel from solar radiation;

second means mountable on the space craft and operable to alternately shade and expose the second adsorber-generator vessel from solar radiation, one of said means being operably conditioned to expose the adsorber-generator vessel which contains refrigerant and the other said means being operably conditioned to shade the other adsorber-generator vessel;

a condenser having an inlet for receiving refrigerant and an outlet for discharge of said fluid;

an evaporator connected in fluid communication with the outlet of said condenser and adapted to evaporate refrigerant liquid introduced therein to thereby produce refrigeration by extracting heat from its environment, said evaporator having an outlet for the discharge of refrigerant fluid;

a conduit system comprising a condenser inlet conduit communicating with the inlet of the condenser, an evaporator exit conduit communicating with the outlet of the evaporator, and a pair of flow conduits respectively communicating with the openings of said adsorber-generator vessel;

means of occluding the outlet of said condenser for separating the liquid and gaseous phases of the refrigerant fluid whereby refrigerant liquid is communicated to the evaporator;

valve means installed in said conduit system and operable in a first control position for communicating the flow conduit associated with the exposed adsorber-generator vessel with the condenser inlet conduit and for communicating the flow conduit associated with the other adsorber-generator vessel with the evaporator exit conduit, said valve means being operable in a second control position for reversing the connections of the flow conduits with the condenser inlet conduit and the evaporator exit conduit; and automatic control means for operating said first and second means to reverse the condition of exposure and non-exposure of the adsorber-generator vessel when the exposed adsorber-generator vessel is substantially depleted of refrigerant fluid and for simultaneously positioning said valve means to reverse the connections of the adsorber-generator flow conduits with the inlet of the condenser and the outlet of the evaporator.

10. An adsorption type refrigeration system adapted for operation in a zero gravity environment, said system comprising:

first and second adsorber-generator vessels each containing a refrigerant-adsorbing substance and having an opening for receiving or discharging refrigerant fluid therethrough, one of said vessels containing refrigerant which has been adsorbed by the refrigerant-adsorbing substance, said refrigerant containing vessel being exposed to solar radiation and the other of said vessels being shielded from solar radiation;

a condenser having an inlet for receiving refrigerant fluid and an outlet for discharge of said fluid;

an evaporator connected in fluid communication with the outlet of said condenser and adapted to evaporate refrigerant liquid introduced therein to thereby produce refrigeration by extracting heat from its environment, said evaporator having an outlet for the discharge of refrigerant fluid;

a conduit system comprising a condenser inlet conduit communicating with the inlet of the condenser and an evaporator exit conduit communicating with the outlet of the evaporator and a pair of flow conduits respectively communicating with the openings of said adsorber-generator vessels;

means occluding the outlet of said condenser for separating the liquid and gaseous phases of the refrigerant fluid whereby refrigerant liquid is communicated to the evaporator;

valve means installed in said conduit system and operable in a first position for communicating the flow conduit associated with the exposed adsorber-generator vessel with the condenser inlet conduit and communicating the flow conduit associated with the other adsorber-generator vessel with the evaporator exit conduit, said valve means being operable in a second position for reversing the connections of the flow conduits with the condenser inlet conduit and the evaporator exit conduit; and an automatic control means for periodically reversing the conditions of exposure and non-exposure of the adsorber-generator vessels to solar radiation and actuating said valve means to reverse the connection of the adsorber-generator flow conduits with the inlet of the condenser and the outlet of the evaporator.

11. Adsorption refrigerating apparatus comprising:

first and second adsorber-generator vessels each containing a substance adapted to adsorb a refrigerant fluid;

a first means adapted to alternately shade and expose said first adsorber generator from solar radiation;

a second means adapted to alternately shade and expose said second adsorber-generator from solar radiation, one of said means being operably conditioned to expose one of said adsorber-generator vessels to solar radiation and the other said means being operably condition to shade the other of said vessles;

a condenser and evaporator in series fluid communication, said condenser having an inlet for receiving a refrigerant fluid and said evaporator having an outlet for said fluid whereby refrigerant fluid circulated through the condenser and evaporator will be successively condensed and evaporated to produce refrigeration;

a conduit system including valve means for communicating the exposed adsorber-generator vessel with the inlet of said condenser and the other of said vessels with the outlet of said evaporator;

means occluding the outlet of said condenser for separating the liquid and gaseous phases of the refrigerant fluid whereby refrigerant liquid is communicated to the evaporator;

automatic control means for operating said first and second means to reverse the conditions of exposure and non-exposure of the absorber-generator vessels when there is substantial depletion of refrigerant fluid in the exposed adsorber-generator vessel, said automatic control means simultaneously actuating said valve means to reverse the connections of the adsorber-generator vessel with the inlet of the condenser and the outlet of the evaporator.

References Cited by the Examiner

UNITED STATES PATENTS

| | | | |
|---|---|---|---|
| 2,030,350 | 2/1936 | Bremser | 62—490 X |
| 2,138,686 | 11/1938 | Altenkirch | 62—483 X |
| 2,944,407 | 7/1960 | Pettis | 62—144 |

ROBERT A. O'LEARY, *Primary Examiner.*

N. R. WILSON, *Assistant Examiner.*